(12) United States Patent
Neystadt et al.

(10) Patent No.: US 11,831,609 B2
(45) Date of Patent: *Nov. 28, 2023

(54) NETWORK SECURITY SYSTEM WITH ENHANCED TRAFFIC ANALYSIS BASED ON FEEDBACK LOOP

(71) Applicant: Akamai Technologies, Inc., Cambridge, MA (US)

(72) Inventors: Eugene ("John") Neystadt, Kfar Saba (IL); Eyal Heiman, Ramot Hashavim (IL); Elisha Ben-Zvi, Hod Hasharon (IL); Asaf Nadler, Hod Hasharon (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,561

(22) Filed: Apr. 18, 2022

(65) Prior Publication Data

US 2022/0385633 A1 Dec. 1, 2022

Related U.S. Application Data

(63) Continuation of application No. 16/168,451, filed on Oct. 23, 2018, now Pat. No. 11,310,201.

(51) Int. Cl.
*H04L 9/40* (2022.01)
*H04L 47/263* (2022.01)
(Continued)

(52) U.S. Cl.
CPC ......... *H04L 63/0245* (2013.01); *G06N 20/00* (2019.01); *H04L 47/263* (2013.01);
(Continued)

(58) Field of Classification Search
CPC .............. H04L 63/0245; H04L 47/263; H04L 61/4511; H04L 63/0236; H04L 63/101;
(Continued)

(56) References Cited

U.S. PATENT DOCUMENTS 9,942,248 B1 * 4/2018 Umland .............. H04L 63/1425
11,245,667 B2 2/2022 Neystadt
(Continued)

OTHER PUBLICATIONS

Schiff et al., "PRI: Privacy Preserving Inspection of Encrypted Network Traffic", May 2016, IEEE Security and Privacy Workshops, pp. 296-303 (Year: 2016).*
U.S. Appl. No. 16/168,451, filed Oct. 23, 2018.
U.S. Appl. No. 16/168,487, filed Oct. 23, 2018.
Transmittal Letter titled Communication Under MPEP § 609.02, submitted with this SB/08 of Apr. 18, 2022, 2 pages.

*Primary Examiner* — Kenneth W Chang

(57) ABSTRACT

This document describes among other things, network security systems that incorporate a feedback loop so as to automatically and dynamically adjust the scope of network traffic that is subject to inspection. Risky traffic can be sent for inspection; risky traffic that is demonstrated to have high rate of threats can be outright blocked without further inspection; traffic that is causing errors due to protocol incompatibility or should not be inspected for regulatory or other reasons can be flagged so it bypasses the security inspection system. The system can operate on a domain by domain basis, IP address basis, or otherwise.

17 Claims, 6 Drawing Sheets

(51) Int. Cl.
*G06N 20/00* (2019.01)
*H04L 61/4511* (2022.01)

(52) U.S. Cl.
CPC ...... *H04L 61/4511* (2022.05); *H04L 63/0236* (2013.01); *H04L 63/101* (2013.01); *H04L 63/1425* (2013.01); *H04L 63/1441* (2013.01); *H04L 63/20* (2013.01)

(58) Field of Classification Search
CPC ..... H04L 63/1425; H04L 63/20; H04L 45/74; H04L 63/168; H04L 63/1441; H04L 63/0227; H04L 63/1408; H04L 63/145; G06N 20/00
See application file for complete search history.

(56) References Cited

U.S. PATENT DOCUMENTS

| | | | |
|---|---|---|---|
| 11,310,201 B2 | 4/2022 | Neystadt | |
| 2005/0044422 A1* | 2/2005 | Cantrell | H04L 63/0263 726/4 |
| 2007/0276958 A1* | 11/2007 | Curtis | H04L 63/0471 709/238 |
| 2011/0286326 A1* | 11/2011 | Awano | H04L 45/42 370/392 |
| 2014/0173712 A1* | 6/2014 | Ferdinand | H04L 63/0236 726/11 |
| 2016/0359900 A1* | 12/2016 | Crisler | H04L 63/1425 |
| 2017/0257388 A1* | 9/2017 | Addepalli | G06N 20/00 |
| 2018/0091453 A1* | 3/2018 | Jakobsson | H04L 63/1441 |

\* cited by examiner

NETWORK SECURITY SYSTEM WITH ENHANCED TRAFFIC ANALYSIS BASED ON FEEDBACK LOOP

BACKGROUND

Technical Field

This document relates generally to network security and more particularly to improved network security systems with enhanced traffic analysis based on feedback loops.

Brief Description of the Related Art

It is known in the art to deploy network security gateways to proxy, decrypt and analyze web and other network traffic, so as to find and block security threats. One kind of network security gateway is a "secure web gateway" or SWG, which is a gateway that analyzes web traffic. The term "web" traffic, in this case, is meant to refer to use of the HTTP application layer protocol, whether or not over TLS, and moreover, regardless of transport layer protocol. Network security gateways may perform any of a wide range of network security checks, including network protocol checks, deep packet inspection, malware/botnet signature detection, anomaly detection, and others.

It is known in the art to route client traffic to a network security gateway using the domain name system, or DNS. More specifically, a local DNS resolver on a private network may apply security intelligence to client DNS lookup requests, based on the domains that clients are seeking to resolve. If a requested domain represents a known security threat, the client can be blocked or directed to the network security gateway instead of to the desired host. This routing of the client request to the network security gateway can be accomplished by giving the client the IP address of the network security gateway instead of the actual IP address corresponding to the domain name, in response to a given DNS name query from the client. Request routing can be accomplished using other techniques, such as IP layer routing, as well.

However, some applications are not compatible with network security gateways and/or with certain kinds of network inspection they may perform. In such cases, the client's application layer communication may break if the traffic is proxied via a network security gateway, even if the end-to-end TLS encryption session is intermediated using trusted Man-in-the-Middle approach.

Another problem is that some traffic should not be decrypted and/or inspected or at least inspected in a different way than typical, because it carries sensitive data such as payment information, medical information or other personal data (e.g., personal identifying information). This problem is increasingly important due to increasing concern over online privacy and accompanying regulation.

Generalizing, it is desirable to limit the inspection of traffic when such inspection may be incompatible with the application or otherwise undesirable.

To address this problem one might attempt to have network security gateways produce error logs and manually analyze those logs and then manually adjust the inspection of network traffic to avoid such errors. However, this would be terribly inadequate: it would be labour intensive, slow (thus creating more errors), and ultimately inaccurate and likely to cause security problems and increase support costs.

It is an object of the teachings hereof to provide a network security system that automatically, dynamically, accurately, and efficiently adjusts the scope of traffic that is subject to inspection, taking into account the above concerns and others that will become apparent in view of this document.

The teachings hereof address the technical problems identified above (and others that will become apparent) by providing systems and methods for improved network security analysis. Hence the teachings hereof represent improvements to network security technology and to the operation of DNS systems, network security gateways, network security services, and other network infrastructure.

BRIEF DESCRIPTION OF THE DRAWINGS

The invention will be better understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. The allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, DNS, HTTP over QUIC, TLS, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a user agent (e.g., browser) presentation, such as that identified by a URL. A page is defined typically by HTML, or other markup language document. The terms 'object' and 'resource' are used interchangeably in this document. The terms 'domain name' and 'hostname' are used interchangeably in this document.

Overview

This document describes, among other things, network security systems that incorporate a feedback loop so as to automatically and dynamically adjust the scope of traffic that is subject to inspection.

Figure 1:
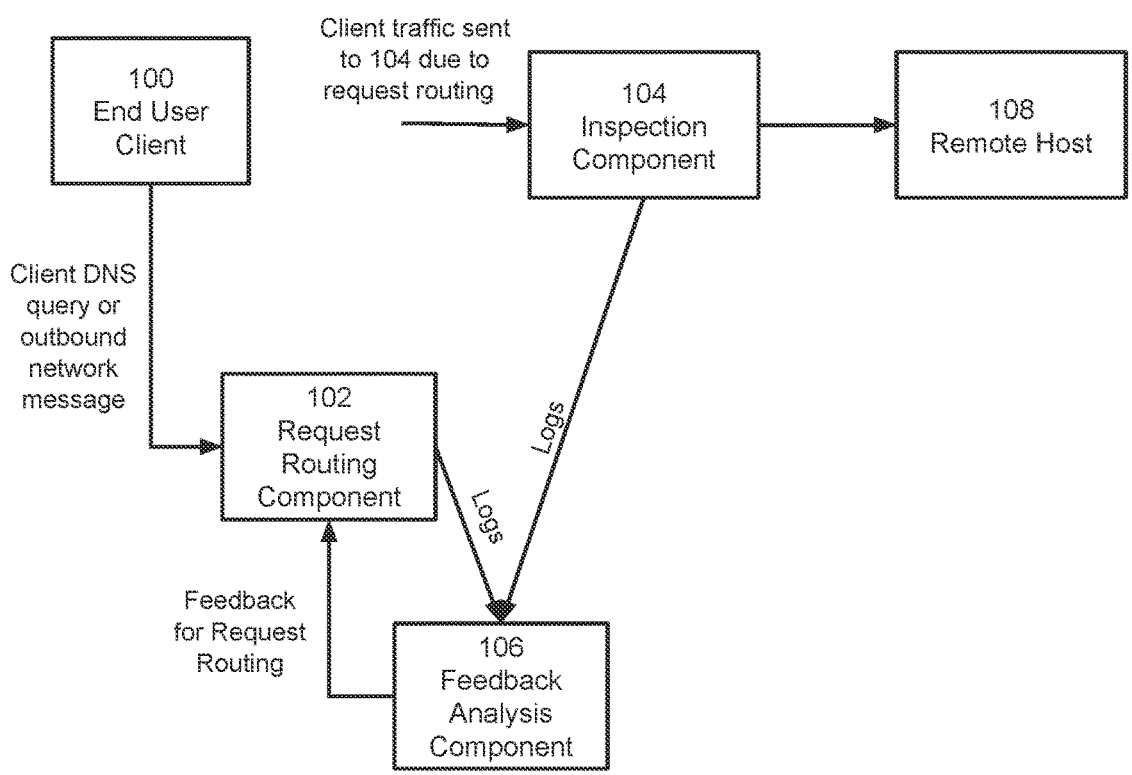
FIG. 1 is an overview diagram of a network security system, in one embodiment, with a feedback loop.

FIG. 1 illustrates a system embodiment. The diagram shows a client 100, a request routing component 102, and an inspection component 104, which proxies traffic to a remote host 108.

The request routing component 102 (which can be, e.g., a DNS resolver or can be a HTTPS Proxy that selectively decrypts HTTP traffic), causes client traffic of interest to arrive at the inspection component for security inspection. The request routing component 102 bases its decision of whether to send traffic to the inspection component 104 is based on threat intelligence (TI), which in this embodiment relies on a few lists that classify domains:

[High Risk Domains]—domains to be blocked. (it should be understood that "blocking" a communication in this context can mean the request routing component 102 failing to respond, directing to a warning page on a host, or otherwise not allowing the request to proceed to the origin, all as known in the art.)

[Risky Domains]—domains to be analyzed by inspection component 104

[Whitelist]—domains that utilize protocols not compatible with inspection component 104, or domains for which scanning is undesired, so they should be sent directly to origin (e.g., remote host 108) bypassing the inspection component 104. This can include domains that are handling "sensitive" traffic that should not be scanned.

[Low Risk Domains]—domains that generate significant amount of traffic with no, or little threats.

[Unclassified Domains]—When the request routing component (102) encounters traffic that doesn't fall within any of the above lists, it can make a decision on whether to route it to inspection component (104) based on configurable policy for these 'unclassified domains, e.g., a policy such as:
  i. Always route to inspection component—100% of the unclassified traffic
  ii. Never route to inspection component
  iii. Rate based route—route to inspection component 104 a small percent (e.g. 2%) of the requests for a given domain, to enable its classification.

The inspection component 104 performs the security inspection and blocks, passes, or proxies client communications to the desired destination, shown as remote host 108. The inspection component 104, sometimes referred to as a network security gateway, thereafter analyzes network traffic sent to or received from the remote host 108 (also referred to as the origin server 108.

As shown in FIG. 1, the request routing component 102 and inspection component 104 send logs to the feedback analysis component 106. The request routing component 102 logs the request routing actions that it performs, e.g., which client requested resolution of which domain, and the decision made by the component 102. The inspection component 104 logs the result of the inspections it performs on the received client requests and other network traffic between the client 100 and remote host 108.

Typically, the client 100 is on an enterprise or home network. The components 102, 104, 106 may be on premise (e.g., in the enterprise data center) or "in the cloud". In the cloud means that the components 102, 104, 106 may be a service hosted on the public Internet and operated by a services provider on behalf of the client and/or enterprise. Such a service is typically multi-tenant. The origin 108 is typically on the public Internet.

An example of a request routing component 102 was already mentioned to be a DNS resolver, sometimes referred to as a local DNS server. Such a DNS resolver can operate to direct client requests to the inspection component when clients ask for the IP address of certain suspicious DNS names, e.g., hostnames of servers external to the enterprise and/or ISP that have are on a blacklist or otherwise indicated to be suspicious. The DNS resolver may be provided as a service by a services provider, meaning that the DNS resolver may be actually deployed external to the private network and it may be multi-tenant.

Other kinds of devices may serve as request routing components 102. For example, a policy based router (PBR) operating at the IP layer could redirect client traffic destined for external IP addresses or IP address blocks to the IP address of the inspection component 104. Using the teachings hereof, a feedback loop could be established so as to dynamically adjust which destination IP addresses warranted request routing to the inspection component 104.

A typical example of an inspection component 104 is a network security gateway. As mentioned above, an example of a network security gateway is a secure web gateway (SWG) that inspects, analyzes and proxies the HTTP and/or HTTPS traffic that the client (after request routing to the SWG) is sending to SWG in order to reach the origin that is associated with the suspicious DNS name. The SWG may be provided as a service by a service provider, such that the SWG may be actually deployed external to the private network, and it may be multi-tenant. Many of the examples described herein will describe a SWG as being the inspection component, but this is merely one example.

In operation, according to the teachings hereof, the outcomes of security analyses can be captured and provided in the feedback loop illustrated in FIG. 1. For example, the logs of the request routing component 102 and the inspection component can be captured and correlated with those of the inspection component 104 to determine the ultimate outcome of a given request routing performed by the request routing component 102. Based on this and/or other feedback, the request routing component 102 can adjust the scope of request routing to the inspection component 104 (e.g., by changing the domains on the lists of domains for which request routing to the inspection component is performed, as indicated by [High Risk Domains], [Risky Domains], and [Whitelist]).

More specifically, the request routing component 102 can produce logs indicating those domains that clients attempted to access and were sent for inspection to 104. The inspection component 104 can produce logs with a variety of information, such as:

- Which domains were accessed successfully?
- Whether access to a given domains failed, due to protocol error?
- Access to which domains actually had threat detected by inspection component 104 in the network traffic?
- a Domains in which traffic sensitive information was detected.
- a Number of bytes sent/received as part of the client request The feedback and analysis component 106 collects logs from components 102 and 104. It analyzes the logs to determine (among other things) situations and/or domains that should be the trigger for adjustments to the request routing scope. These may include domains associated with a failed on-ramp (traffic for domains that was directed to the inspection component 104, but never reached it), traffic failures (domains that produced a rate of traffic failures above threshold, indicating that the domain is incompatible with inspection component 104), previously risky but through observation actually high risk domains (domains where rate of threats exceeds a configured threshold), previously risky but through observation low risk domains (domains where number of detected security events compared to overall traffic volume for the domain falls below a configured target), and sensitive domains (for which rate of sensitive information exceeded a threshold).

The feedback analysis component 106 can filter the results and/or verify them to minimize false positives and/or false negatives. It then updates the requesting routing component 102 with a new configuration (e.g., new domain lists for [High Risk Domains], [Risky Domains], [Whitelist], [Low Risk Domains]), producing a feedback loop. The feedback loop thus acts to adjust to which future domains that the requesting routing component 102 sends to the inspection component 104 and which are allowed to bypass the inspection component 104 and go directly to a remote host.

As those skilled in the art will recognize, the feedback component 106 preferably (though not necessarily) operates at the same layer as the requesting routing component 102. In other words, if the requesting routing component 102 operates to perform an IP layer redirection, then the feedback loop can generate statistics for IP addresses (as opposed to domain names), and produces new lists in the form of high risk IP address ranges, risky IP addresses, and IP address whitelists. The system could operate using both domains and IP addresses at the same time, too.

With the foregoing by way of overview detailed but non-limiting examples of the invention are now provided.

Detailed System Embodiment

Figure 2:
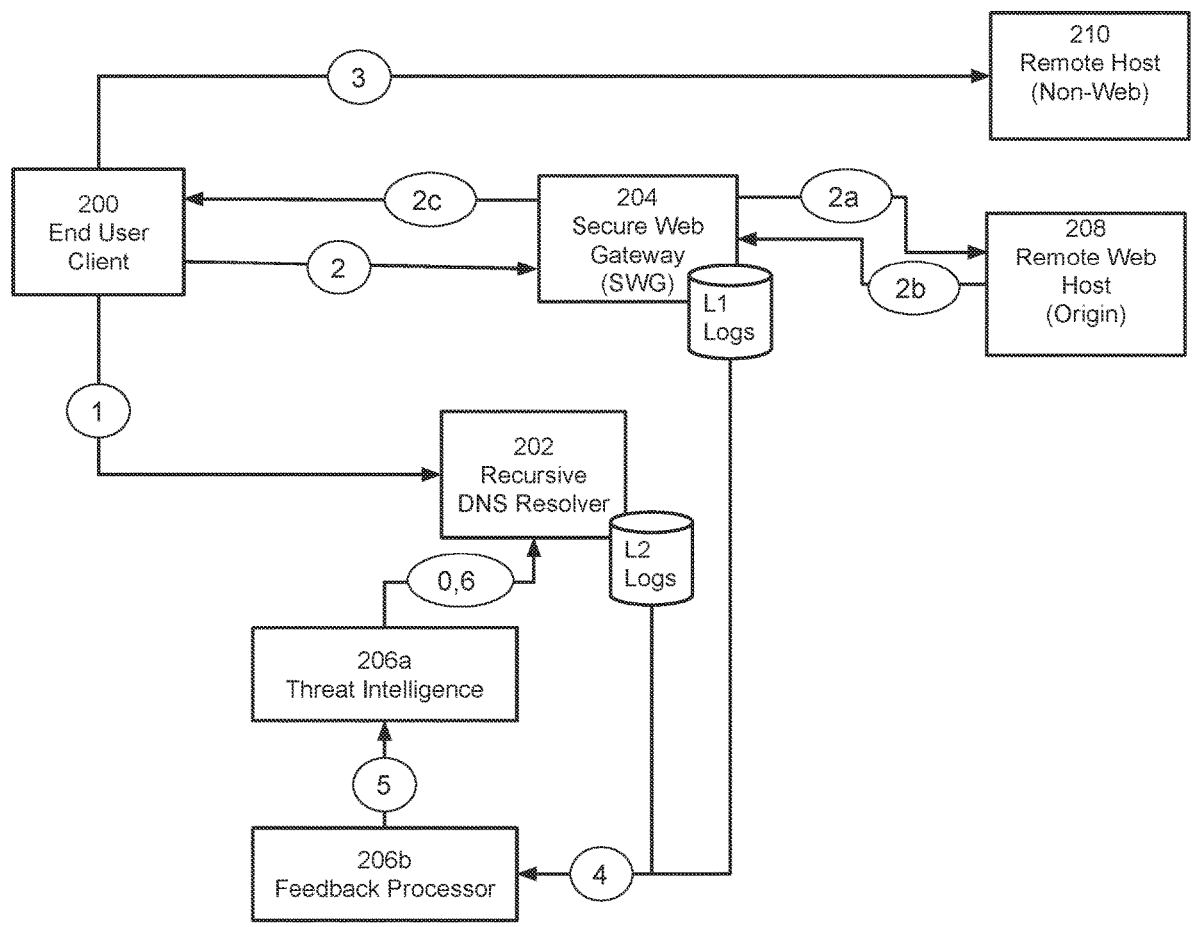
FIG. 2 is a detailed diagram of a network security system, in one embodiment, with feedback loop.

FIG. 2 illustrates one embodiment of a system according to the teachings hereof. A request routing component 102 is implemented as a DNS server 202. An inspection component 104 is realized in this embodiment as a secure web gateway (SWG) 204.

It is noted that each of the components shown in FIG. 2 may be implemented by one or more general purpose computers with hardware processors executing computer program instructions; the illustrated components may be combined in and/or otherwise allocated across any number of physical computers.

Threat intelligence component 206a is used to generate a configuration comprising list of domains which are a threat. The algorithms for such detection can be based on previously observed threats, domain registration information, popularity, or security data feeds (reputation feeds), or any other approach. The configuration data, e.g., in the form of lists, are sent to the DNS server 202 at arrow (0). A policy for how to handle "unclassified" domains also can be provided. The DNS server 202 can use the generated lists to decide whether client requests should be directed to the inspection component, in this case illustrated as the SWG 204.

As mentioned before, the lists can include:
- [High Risk Domains]—domains to be blocked by DNS server 202
- [Risky Domains]—domains to be routed to SWG 204 for inspection
- [Whitelist]—domains that utilize protocols not compatible with inspection component 204, contain sensitive data, or otherwise should bypass the system (shown at arrow (3) in FIG. 2)
- [Low Risk Domains]—domains that are not inspected to reduce costs/improve system performance For example, the DNS server 202 can lookup the domain requested by the client domain in threat intelligence 206a Intelligence and if it is listed in the list [Risky Domains], then the DNS server 202 responds with the IP address of the SWG 204, thus directing the traffic there.

More specifically, assume an end user opens an application on a client device (end user client 200) and the user and/or application attempts to go to website or reach a particular service by domain name. At arrow (1), the application sends a DNS request to a DNS server 202, which is enhanced with threat protection capability for the end user's network (e.g., the enterprise network or the network of the ISP, or otherwise). The DNS server 202 looks up the queried domain name in the list of domains previously produced by threat intelligence 206a. (at arrow (0)) and responds with either (in the case of inspection being needed, arrow 2) the IP address of the SWG 204, which will inspect the traffic, or (in the case of bypass case, arrow 3) the actual IP address of the origin host corresponding to the domain name. The DNS server 202 produces logs (L2 logs in FIG. 2) indicating a particular domain was actually looked up by the client, a [timestamp] of the lookup, and whether the DNS server 202 redirected it to the SWG 204 for inspection or other decision that was made (in other words, where the client was directed).

Figure 3:
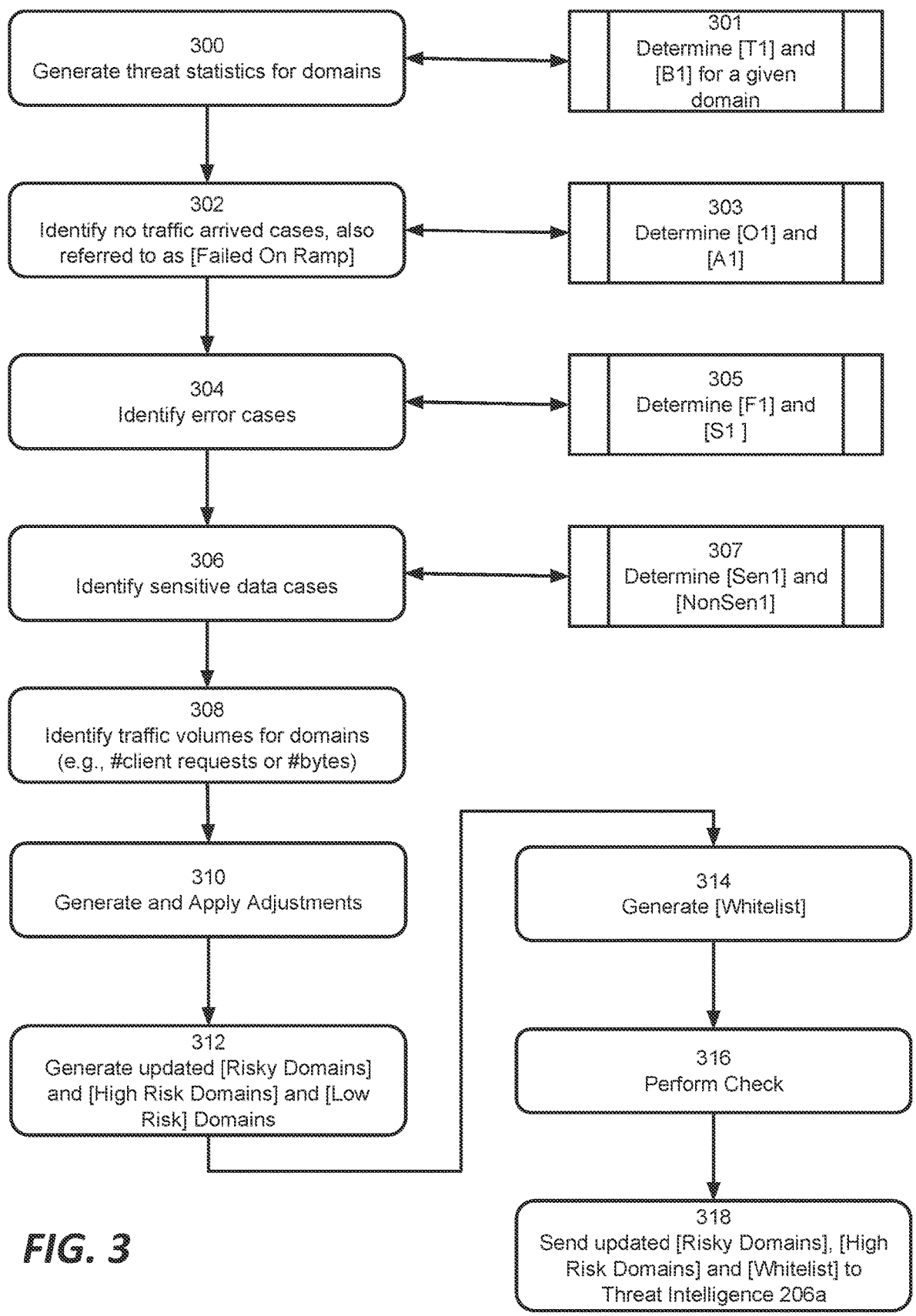
FIG. 3 is a diagram illustrating processing performed at the feedback processor component shown in FIG. 2.

Domains with traffic that is known to be incompatible with the SWG 204 can be allowed to bypass, i.e,. the client is given the actual remote host IP address, in order to avoid breaking the client to host communications. An example of this is shown in FIG. 3 at arrow (3), where non-web traffic is sent to remote host 210. Initially the DNS server 202 may not know which domains should be bypassed in this way; but as will be seen, the teachings hereof will develop a [Whitelist] using feedback to accurately identify these domains. Alternatively, the system could be arranged such that even bypass traffic was routed to another type of inspection component (e.g., one tailored for another kind of protocol), rather than a bypass to the origin.

At arrow (2), the client sends an HTTP request to the IP address provided by DNS server 202. This assumes that the request was selected for inspection, so the IP address points to the SWG 204.

Note that, in some embodiments, decisions on whether to bypass the SWG 204 can be moved to the SWG 204 itself. In this embodiment, the DNS server 202 responds with the IP address of the SWG 204 in many or all cases. Then, when the client directs a request (e.g., an HTTP request at arrow (2)) to the SWG 204, the SWG 204 can read the client's intended domain in the host header of an HTTP message or even in the SNI field of a TLS encrypted message and decide whether to proxy layer-3 (UDP/TCP) directly to origin or terminate the connection and perform its security function as described further below.

Upon receiving the client's HTTP request at arrow (2), the SWG 204 analyzes the request for threats. The SWG 204 might block the request. The SWG 204 can forward the request to origin server (208), if it passes the security checks, at arrow (2a). The SWG 204 can receive a response from the remote server 208 at arrow (2b), which it also can examine and block, or forward (at arrow 2c) to the end user client 200. Any number of request and responses may occur in a given client session and the SWG 204 can examine and block any or all of them. More generally, the teachings hereof are not limited to any particular inspection technique or threat detection approach being performed at the SWG 204.

The SWG 204 generates logs (L1 Logs in FIG. 2) indicating whether a threat was detected in a given client request, or detected in a host's response, and the domain name associated with that request/response, as well as other pertinent information such as timestamps and IP addresses. The SWG 204 can also generate logs indicating whether a failure of some kind occurred.

By way of example, the L1 logs can include: such data as follows:

Security related & sensitive data
1. Whether a request (2) was identified to include a threat
2. Whether a response (2b) from origin (108) indicated a threat
3. Number of bytes transferred in client request and response (e.g., response from SWG and/or response from origin)
4. The HTTP method (either GET, POST, PUT, HEAD for example)
5. The specific URL accessed
6. The HTTP request headers (including referrer, content-length, content-type, user-agent)
7. The TLS certificate information of the origin server (including its name, certificate chain and expiration date)
8. The HTTP response line (including response code, HTTP version, HTTP server software name and version)
9. The HTTP response (including content-length, web server name if available, etc.)
10. Whether threats or malware were detected in the response based on antivirus and/or anti-malware scan by SWG 204
11. Whether sensitive data was found in a request or response (determined, e.g., based on configurable patterns/regexes such as payment card numbers, social security numbers, addresses, etc.)

Failure/Error related data
12. Whether traffic processing failed due to a protocol being incompatible (e.g., because it was not HTTP, or for other reasons); such logs can include [timestamp] when traffic was observed, and potentially the observed protocol.
13. Whether a client request arrived to an expected port for application protocol secured or not (e.g. port 80 or 443)
14. Whether request included a valid protocol message (e.g. well formed HTTP request)
15. Whether a request (2) was a valid request for an application protocol
16. For TLS, whether the TLS handshake included SNI TLS indication (required for TLS Proxy)
17. For HTTP whether traffic had a Host: header required for HTTP Gateway
18. Whether a request (2a) to origin (108) failed, and why
19. Whether a response (2b) from origin (108) indicated (2b) a failure and if so the failure code
20. Any other indications when traffic processing fails The logs from the DNS server 202 and the SWG 204 are collected at arrow (4) in FIG. 2. by the feedback processor 206a.

Multiple SWG 204 instances and multiple DNS servers 202 may be producing logs in a system (but this is not shown in FIG. 2 to avoid cluttering the diagram). Put another way, the feedback processor 206b can collect the logs from multiple machines 202, 204, and the logs are merged before processing. Generalizing, multiple inspection components 102 and request routing components 104 (for any protocol/layer) may provide logs in the manner shown to the feedback processor 206b.

The feedback processor 206b processes the logs to determine future on-ramp decisions. Features can be extracted from the logs directly (for example: number of requests arriving to an unexpected port) or can be computed based on aggregated logs (for example: identifying shared-content websites based on the different URLs accessed). These features can be used to classify domains in a supervised machine-learning based approach or by heuristics. A heuristics based example is outlined in FIG. 3, and is explained below. A machine learning approach is outlined in FIG. 4 and will be described later in this document.

At 300, the feedback processor 206b generates statistics for a given time period to characterize domains that were examined by the SWG 204, and in particular to identify how often each domain's traffic exhibited either a threat or was benign, e.g., based on the data in the L1 log items 1 to 3 above. This can be accomplished by, at subroutine 301, looking at each domain that a client queried in the L2 logs and determining based on the L1 logs whether the domain turned out to have a security threat, e.g., for given domain, calculate number of instances [T1] when request or response analysis identified a real threat and the number of instances [B1] requests and responses that were benign.

At 302, the feedback processor 206b identifies cases where no traffic arrived at the SWG 204 even though it was directed there by the DNS server 202. This is referred to as [Failed On Ramp]. This can be accomplished by, at 201, for each log line in L1: find number of instances [O1] that the domain appears in L1 logs, and the number of cases it appears in L2 logs [A1] for the same time period.

At 304, the feedback processor 206b identifies, for each domain, broken traffic cases during a given time period. This can be accomplished by identifying, for each domain, the number of instances [F1] that the given domain appears in L2 logs, with one of the error conditions indicated in L1 logs items 4-12, and the number of [S1] cases, which are when the domain was properly handled for the same time period.

At 306, the feedback processor 206b identifies, for a given time period for each domain, cases where a domain was associated with traffic carrying sensitive data. This can be accomplished by determining the number of instances [Sen1] that a domain appears in L2 logs and with indication of sensitive data observed in L1 logs. The number of instances when sensitive data was not detected for a domain is also captured [NonSen1].

At 308, the feedback processor 206 identifies traffic volume for each domain based on number of client requests or number of bytes transferred [Vol1] and number of security events detected for that domain [Sec1] during traffic inspection.

The statistics generated in steps 300 to 308 are now used at 310. At 310, the feedback processor 206b processes the logs to produce one or more feedback adjustments that will affect system operation going forward. These adjustments can include:
- a Generate updates to [Risky Domains]; identify domains currently listed as [Risky Domains] for which the ratio of threat carrying traffic to benign traffic is sufficiently low that the feedback processor 206b believes they can be removed from [Risky Domains]. This can be accomplished by identifying those domains seen at the SWG 204 where the ratio of [T1]÷[B1] cases is less than a configured [threat threshold for removal].
- a Generate updates to [High Risk Domains]; identify domains currently listed as [Risky Domains] for which the ratio of threat carrying traffic to benign traffic is sufficiently high that they can be added to [High Risk Domains] and blocked by the DNS server 202. This can be accomplished by identifying those domains where the proportion of [T1]÷[B1] cases is more than a configured [threat threshold for high-risk].
- a Generate [Failed Onramp]: generate a list of domains where the occurrence of failed onramps is sufficiently high to justify removing them from inspection by the SWG 204 (although perhaps they should be directed elsewhere for inspection or flagged for manual review). This can be accomplished by identifying those domains where the number of [A1] minus [O1] cases is less than [onramp usage threshold].
- Generate [Traffic Failures]: generate a list of domains where the occurrence of traffic failures is sufficiently high to justify removing them from inspection by the SWG 204 (although perhaps they should be directed elsewhere for inspection or flagged for manual review). This can be done by identifying domains where the ratio of [S1]÷[F1] cases is less than [success threshold], meaning a threshold ratio of cases are not successful.
- [Sensitive Domains]: identify domains where traffic contains a sufficiently high number of sensitive data that it should be excluded from the inspection or otherwise treated specially. This can be accomplished by calculating, for a given domain's traffic, whether the ratio of [Sen1]÷[NonSen1] cases is less than a [sensitive data threshold].
- a [Low Risk Domains] identifies domains where security event rate compared against total volume is low, by calculating [Sec1]÷[Vol1] and taking bottom X % of the domains according to configured target (e.g. all, 10%, 90%)

The adjustments are sometimes referred to as "filters" because they filter out domains that should not be redirected, e.g., because they are not high risk, because redirection leads to errors (due to incompatible protocol or otherwise), and/or because traffic to those domains has a high level of sensitive data.

At 312, the feedback processor 206b then produces an update to the [Risky Domains] list that excludes the domains that exhibit at least a specified proportion (a configurable value) of benign traffic. (Note that the Threat Intelligence 206a could override and/or add newly identified risky domains in a later step, see FIG. 2, at arrows (5,6).) Optionally, domains in the list can be flagged to require approval, if universal domain popularity (based on external source) is above configurable threshold. For example, the list of candidate domains can be sent for approval to an approval component. Approval after automated checks or manual verification by an human external is received back.

Preferably, each entry in the [Risky Domains] list would include a configurable [decay] value, indicating how long the entry should remain on the list before being discarded. The [decay] value essentially functions as a time to live (TTL) value. This means that after a time, an entry on the list will expire and be removed (presuming no new threats have been found for that domain).

Note that step 312 could be performed equivalently by producing an entirely new and complete baseline list or a delta list since the last baseline, of domains identified as low risk, i.e., those that the feedback processor 206b believes should be removed from the final [Risky Domains] list because a sufficiently high proportion of traffic is benign, such that inspection is not needed.

Also at 312, the feedback processor 206b produces an update to the [High Risk Domains] list that includes the domains with a high proportion of threat traffic. This traffic can represent domains that should be blocked at the DNS server 202 as part of the [High Risk Domains] list, rather than being treated merely as [Risky Domains] and sent to the SWG 204 for inspection—because of this high likelihood of that domain's traffic being a threat. Again, preferably, each list entry would include a configurable [decay] value, indicating, when entry should be discarded. This means that after a time, an entry on the list will expire and be removed (presuming no new threats have been found for that domain).

At 314, the feedback processor 206b produces an update to [Whitelist], which identifies domains that should not be directed to the SWG 204. This list can be created by merging the lists of domains in [Failed Onramp], [Traffic Failures] and [Sensitive Domains]. During the merge process, the [Whitelist] is annotated with for each domain with the [reason] that it was marked for whitelisting, e.g., which of the thresholds was crossed. Preferably, each list entry would include a configurable [decay] value, indicating when entry should be discarded from the [Whitelist].

At 316, the feedback processor 206b can perform a check with another system before issuing the new updates to the lists to the threat intelligence system 206a. For example, the feedback processor 206b can send the produced list of all domains considered incompatible with security gateway (in step 314), to another system for review and approval, The review and approval may be automated or manual. Preferably, the feedback processor 206b includes the [reason] for whitelisting each domain so that the external system can access this information. The external review and approval system may respond with a modified list (e.g. a modified [Whitelist]) with some domains removed from the initial [Whitelist], indicating that those domains should remain in the list.

At 318, the feedback processor 206b sends to threat intelligence 206a the final [High Risk Domains] and [Whitelist] of DNS domains. This is shown in FIG. 2 at arrow (5).

In some embodiments, the threat intelligence component (206a), can alter these lists, overriding the recommendation of the feedback processor 206b. The threat intelligence component 206a then generates the final updated lists of:
- [High Risk Domains]—to be blocked
- [Risky Domains]—to be analyzed by security gateway

[Whitelist] domains that utilize protocols not compatible with inspection component 104 or are sensitive domains or for other reasons are domains for which traffic must be sent directly to origin (108 or other) bypassing the inspection component 104

[Low Risk Domains] list of domains for which inspection can be skipped.

These lists update the lists that were sent previously at step (0) in FIG. 2.

The threat intelligence system 206a can then distribute the new configurations (in the form or new lists) at arrow (6) in FIG. 2.

As a result of the updated lists, the [High Risk Domains] list, the [Risky Domains] and the [Whitelist] are more accurate, so the system operates with fewer false positives and false negatives. Some traffic, such as that causing errors at the SWG 204 or that is resulting in sensitive data being stored at the SWG 204, can be put on the [Whitelist] and bypass the inspection. As mentioned before, this possibility is illustrated at step (3) in FIG. 2.

Teachings Apply Equally to IP Layer Embodiments

It should be understood by those skilled in the art that while the above process has described the feedback analysis as occurring on the basis of domains (e.g. which domains to block, or send for inspection, which to bypass, etc.), in an alternate embodiment, the feedback analysis can be performed on the basis of IP addresses. For example, if the DNS server 202 is replaced by an IP layer request routing component 102, then preferably the logs are produced with respect to IP addresses and the feedback analysis 206b produces configuration updates with newly added high risk IP addresses, as well as Ip addresses that should be whitelisted because request routing to the SWG 204 produces errors, for example.

Multi-Tenancy

The teachings above can be extended by operating the SWG 204 on a multi-tenant basis. That is, the inspection component 104 (and optionally the requesting routing component 102 also) can be implemented as a hosted service for a variety of tenants (e.g., multiple different enterprises, ISPs, etc.) The request routing, inspection, and feedback logic can be applied to the traffic for each tenant on a customized basis. For example, each tenant can have independently configured thresholds for the feedback processing (as described with respect to FIG. 3, and specifically steps 300 to 308).

Machine Learning Embodiment

The mapping of observed domains to the [Risky Domains] configuration list (e.g., can also be implemented using machine learning algorithms, as mentioned above. In other words, the feedback processor 206b can be implemented using, at least in part, a machine learning approach to identify and/or update the list of [Risky Domains]. Those domains identified as [Risky Domains] by machine learning can be routed to and examined by the SWG 204 using the feedback system as already described for FIGS. 1 to 3, and based on the feedback from [L1] and [L2] and the heuristics, such domains can be moved to a [High-Risk Domains], [Low-Risk Domains], [Failed OnRamp], [Sensitive] or any other list. In other words, the machine learning embodiment can be used to generate a [Risky Domains] list, while at the same time, the previously-described heuristics approaches can be used to generate the other lists.

Figure 4:
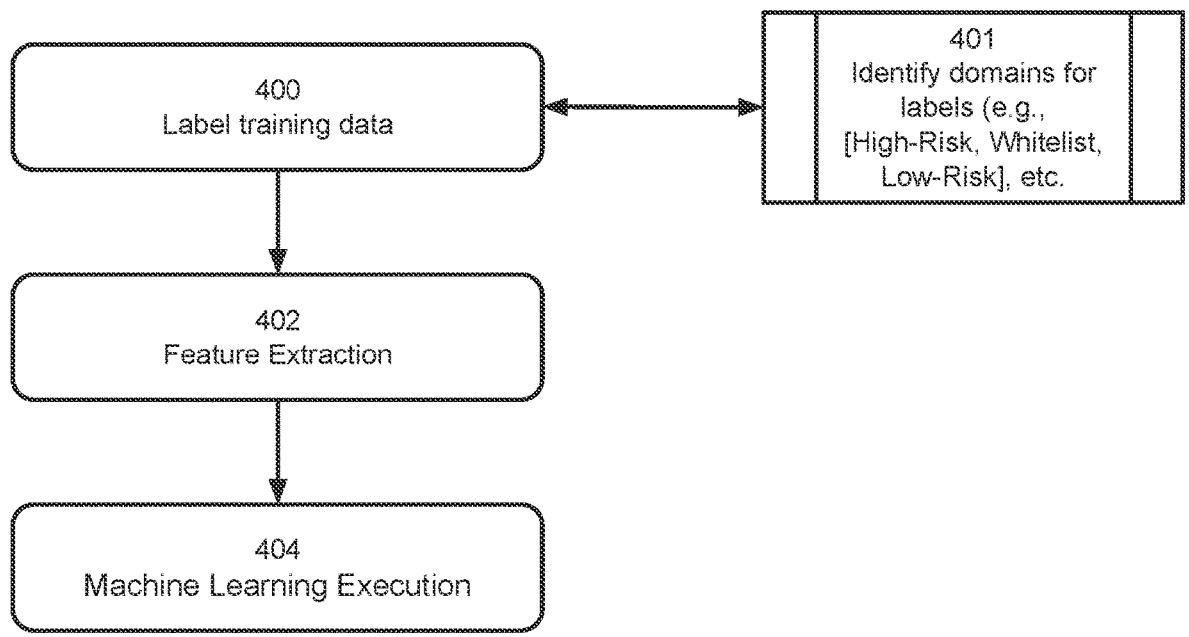
FIG. 4 is a diagram illustrating processing performed at the feedback processor component shown in FIG. 2.

The application of machine learning algorithm uses an input set of data having of the following: labeled data, feature extraction and the type of machine learning algorithms (e.g., supervised, unsupervised and reinforcement learning), The approach is outlined in the steps shown in FIG. 4.

The labeling of training data occurs at 400. The labeling process involves assigning domains in the training data with a label. One such label is a label that indicates if they are known to host malware. Such domains can be identified (at 401) using threat intelligence data feeds as known in the art. Such domains also could be identified by running the system shown in FIGS. 2-3 for a time period, in order to gather the statistics on the incidence of threats found in traffic, as mentioned with respect to FIG. 3, steps 300-301, and applying the heuristics to identify a starting list of [Risky Domains] (and/or [High Risk Domains] or other) domains.

At 401, labels can be created for other class of traffic, such as the [Whitelist] domain for traffic, which can be made up of labels for [Failed Onramp], [Traffic Failures] and [Sensitive Domains]. [Low-Risk] domains could also be a label. In all of the foregoing examples, the labels can be determined (initially) by running the system as explained above with respect to FIGS. 2-3 to produce an initial listing of domains that should have a given label. Then the initial list can be verified with manual and/or other kind of verification checks.

The labels can be either binary, multiclass, discrete or continuous. For example, binary labeling would be set to true if the domain hosted at least one malware and false otherwise). Multiclass labeling can assign domains based on the type of malware that were hosted (e.g., domains that hosted malicious Javascript files would labeled differently than domains that hosts malicious portable executable files, in other words, multiple classes underneath [High-Risk Domains]). Discrete and continuous labeling can be used to assess a risk score by assigning the number of detected malware or the rate of hosted files that were detected as mal ware.

The selection of the labeling type is dependent on the available data for training and the machine learning task (e.g., binary classification, multiclass classification or regression). Binary classification should correspond to binary labels, multiclass classification and multiclass labels and regression to either discrete or continuous. Also, the available data for training should be used to set a fitting function. For example: if the data is collected by an SWG 204 that observes every file that appears in the traffic and there has full information, the binary label can be assigned as false for domains that never hosted malware. However, if the available data is partial (e.g., collected from a 3rd party feed), the label can be assigned true only for domains that almost surely hosted malware and fake for every other domain whose status is unknown.

Feature extraction occurs at 402. The feature extraction focus is preferably on in-band features of the incoming HTTP traffic [L1] (as received with the features described above for [L1], including e.g., those in paragraph 0049) and incoming DNS traffic [L2] (as received with the features described above for [L2], including e.g., those mentioned in paragraph 0043) but can also utilize freely available out of band data, such as: WHOIS information that describes the registration details for every domain such as: the registration date, the domain owner, the country in which the domain was registered, etc.

The feature extraction technical process is is dependent on the machine learning model. Traditional machine learning models (i.e., non-deep models) would require discrete and continuous variables that are well defined. For example: a domain feature vectors would include human designed features based on its HTTP traffic such as: average hourly HTTP requests, rate of hosted executables by content-type value, binary flag of whether the domain uses a vulnerable web server version, etc. In contrast, for deep machine learning models that are often described as featureless models, the input can be the text of the HTTP requests and/or response as a whole. With sufficient data samples and computational resources, these models are often capable of detecting patterns without a human expert to design and extract features.

Table 1 below provides an example of a training set for a supervised learning model in which the features were designed and extracted implicitly. Every entry in the training set correspond to a single domain. The rightmost column is a binary label so that it is set to True only if the domain was known to host malware. The rest of the columns include discrete, continuous and binary features that are assumed to have a relation with the latent variable that the model is trying to fit (i.e., the label).

TABLE 1

| Domain | Rate of executable files found | ... | Web server version has known vulnerabilities | Label |
|---|---|---|---|---|
| www.example.com | 0.43 | ... | True | True |
| ... | ... | ... | ... | ... |
| www.example3.com | 0.01 | ... | False | False |

The type of machine learning task (i.e., supervised, unsupervised or reinforcement) is subject to availability of labels as described above. In cases of full visibility to hosted files (e.g., anti-virusscans all traffic and returns true if a malware was detected), supervised learning would most suitable be ideal to train and measure. However, if there are rarely any labels (e.g., no anti-virusscans) the type of machine learning task must be unsupervised. In cases of unsupervised learning, one can cluster the data by the set extracted features (examples of which were mentioned above with respect to step 402) to output a list of risky domains based on its assigned clusters. For example: clusters of domains that host a large number of executables would be set as [Risky Domain].

The last alternative of reinforcement learning would fit the case in which only partial information is available and be collected upon demand (e.g., only a small portion of domains can be scanned). The use of reinforcement learning in this case would require the definition of a state (e.g., the set of scanned domains), actions (e.g., remove/add a domain to the scanning list) and a reward (e.g., a positive scalar for every detected malware and negative scalar for a period without detections). The reward can be cumulative and therefore assist in reinforcing the algorithm to select domains that host malware based on trial and error (see Table 1 for example).

Figure 5:
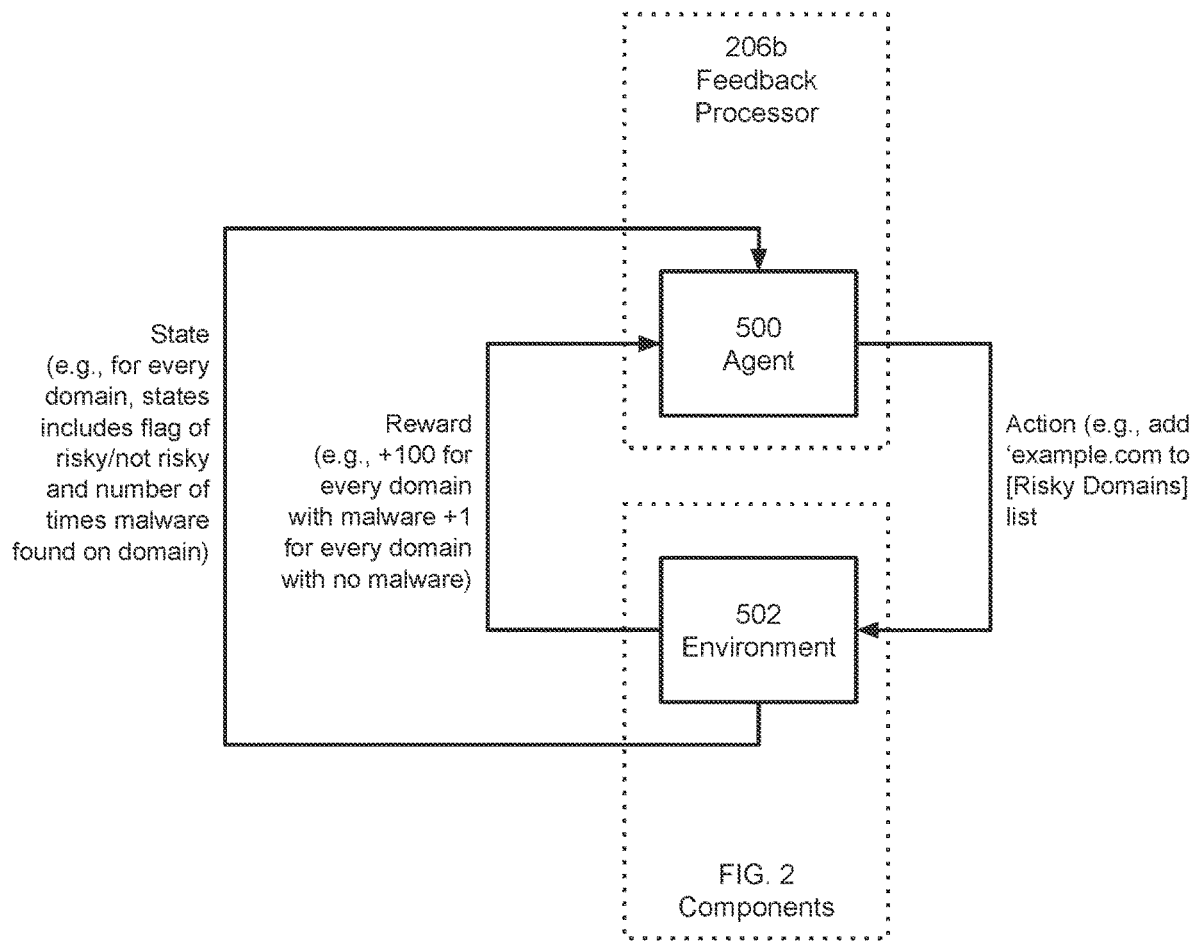
FIG. 5 is a diagram illustrating a machine learning embodiment for the feedback processor component shown in FIG. 2; and, FIG. 6 is a block diagram illustrating hardware in a computer system that may be used to implement the teachings hereof.

FIG. 5 presents a machine learning embodiment in which the selected task is reinforcement learning. This task is most suitable when only partial information is available (e.g., malware detections at the discrete time t+1 that are required for labeling are available only for the set of domains that are marked as risky at the discrete time t). In FIG. 5, the agent 500 corresponds to a machine learning agent running in conjunction with the system shown in FIG. 2. In other words, the agent 500 is a component within the feedback processor 206b that takes in the L1 and L2 logs. The environment represents the remainder of FIG. 2. In other words, the "Action" is pushed to the threat intelligence engine 206a for deployment in the DNS resolver 202. The reward information comes from an administrator configuration of the feedback processor 206b; the state information is represented by the information in the L1 and L2 logs.

In this scheme, on every discrete timestamp the agent 500 acquires a state and a reward for the actions it conducted in the previous timestamp. The state may include a new labeling for [Risky Domains] domains that were set on the previous timestamp based on malware that were detected on them, as indicated in the L1 logs, and the reward can be the sum of positive incentives for malware detection and negative incentive for no detections. For example: the state may include 100 [Risky Domains]domains, 4 of which hosted malware or other firewall rule triggers, as found by the SWG 204 and reported in L1. Moreover, the reward may be set so that malware detection (or other firewall rule) rewards 100 points and no malware detection rewards −1 points for every domains. Therefore, the reward at the described timestamp would be $4*(+100)+96*(-1)=304$. Based on the reward, the agent 500 is incentivized the maintain the domains in which malware were detected (referred to as "exploit") as well as remove domains in which malware were not detected from the [Risky Domains] list and perhaps add new ones (referred to as "explore").

The machine learning model should be selected based on the task, including in particular the intended volume of traffic. A selection of a supervised learning task would require a supervised learning model (e.g., random forest, decision tree, naive bayes, etc.). Similarly, unsupervised learning tasks would require unsupervised models (es., DBSCAN clustering, expectation-maximization, etc.) and reinforcement learning would require a suitable model (e.g., Q-learning).

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
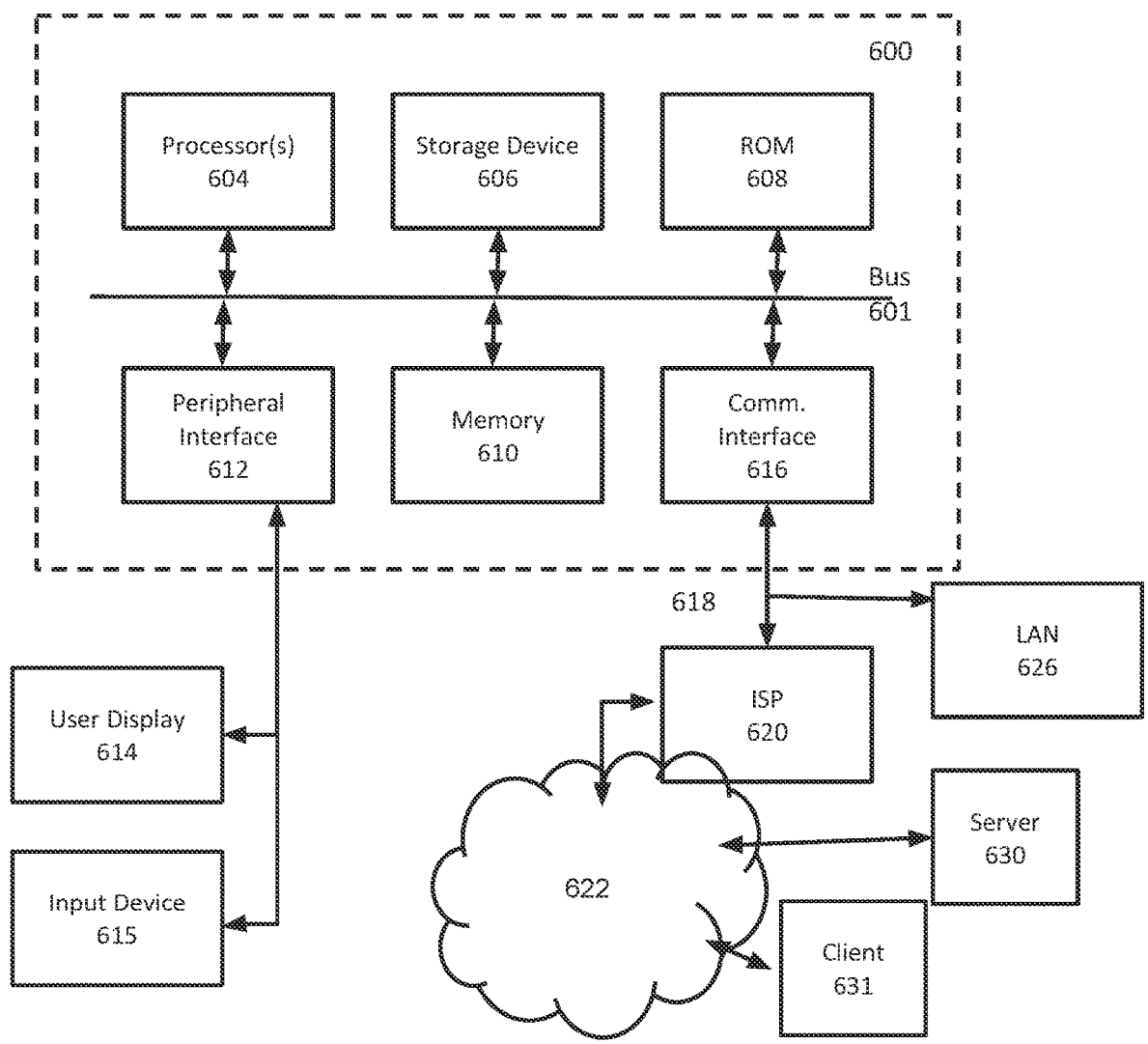

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be Intel based computers running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 communicatively couples computer system 600 to a user display 614 that displays the output of software executing on the computer system, and an input device 615 (es., a keyboard, mouse, trackpad, touchscreen) that communicates user input and instructions to the computer system 600. The peripheral interface 612 may include interface circuitry, control and/or level-shifting logic for local buses Universal Serial Bus (USB), IEEE 1394, or other communication links.

Computer system 600 is coupled to a communication interface 616 that provides a link (e.g., at a physical layer, data link layer,) between the system bus 601 and an external communication link. The communication interface 616 provides a network link 618. The communication interface 616 may represent a Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 608, or storage device 606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 618 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A system for automatically adjusting a scope of network traffic that is subject to security inspection, the system comprising one or more hardware processors and memory storing computer program instructions for execution on the one or more hardware processors to provide:
   a first network device that in operation directs network traffic that was sent from a client for a server instead to a second network device for inspection, said directing being in accord with a configuration;
   a second network device that in operation receives said network traffic directed by the first network device to the second network device for inspection, and performs said inspection; and,
   a feedback analysis system that observes results of inspections by the second network device and adjusts a scope of said network traffic directed by the first network device to the second network device;
   wherein the feedback analysis system bases said adjustment on observing at least one of the following classes of network traffic and taking an action with respect thereto:
      (a) a class of network traffic that, upon inspection by the second network device, produces errors that cause the feedback analysis system to deem the class of network traffic incompatible with inspection at the second network device, and,
      (b) a class of network traffic that, upon inspection by the second network device, contains sensitive data that causes the feedback analysis system to deem the class of network traffic not suitable for inspection at the second network device,
   the classes of network traffic (a) and (b) each being defined by any of domain names and IP addresses.

2. The system of claim 1, wherein said adjusting of the scope of the network traffic directed by the first network device to the second network device comprises the feedback analysis system instructing the first network device to stop directing the class of network traffic upon which the adjustment was based to the second network device.

3. The system of claim 1, wherein each of the classes of network traffic (a), (b) are defined by domain names.

4. The system of claim 1, wherein each of the classes of network traffic (a), (b) are defined by IP addresses.

5. The system of claim 1, wherein the feedback analysis system bases said adjustment on at least:
   (a) the class of network traffic that, upon inspection by the second network device, produces errors that cause the feedback analysis system to deem the class of network traffic incompatible with inspection at the second network device.

6. The system of claim 1, wherein the feedback analysis system bases said adjustment on at least:

(b) the class of network traffic that, upon inspection by the second network device, contains sensitive data that causes the feedback analysis system to deem the class of network traffic not suitable for inspection at the second network device.

7. The system of claim 6, wherein the sensitive data comprises any of: payment information and medical information.

8. The system of claim 6, wherein the sensitive data comprises personal identifying information.

9. A method for automatically adjusting a scope of network traffic that is subject to security inspection, comprising:
   directing network traffic that was sent from a client for a server instead to a network device for inspection, said directing being in accord with a configuration; and,
   observing results of inspection by the network device and adjusting a scope of said network traffic directed to the network device;
   wherein adjustment is based on observing at least one of the following classes of network traffic and taking an action with respect thereto:
   (a) a class of network traffic that, upon inspection by the network device, produces errors that cause a feedback analysis system to deem the class of network traffic incompatible with inspection at the network device, and,
   (b) a class of network traffic that, upon inspection by the network device, contains sensitive data that causes the feedback analysis system to deem the class of network traffic not suitable for inspection at the network device,
   the classes of network traffic (a) and (b) each being defined by any of domain names and IP addresses.

10. The method of claim 9, wherein said adjusting of the scope of the network traffic directed to the network device comprises stopping the directing of the class of network traffic upon which the adjustment was based to the network device.

11. The method of claim 9, wherein each of the classes of network traffic (a), (b) are defined by domain names.

12. The method of claim 9, wherein each of the classes of network traffic (a), (b) are defined by IP addresses.

13. The method of claim 9, wherein the adjustment is based on at least:
   (a) the class of network traffic that, upon inspection by the network device, produces errors that cause the feedback analysis system to deem the class of network traffic incompatible with inspection at the network device.

14. The method of claim 9, wherein the adjustment is based on at least:
   (b) the class of network traffic that, upon inspection by the network device, contains sensitive data that causes the feedback analysis system to deem the class of network traffic not suitable for inspection at the network device.

15. The method of claim 14, wherein the sensitive data comprises any of: payment information and medical information.

16. The method of claim 14, wherein the sensitive data comprises personal identifying information.

17. A non-transitory computer-readable medium storing computer program instructions for execution by one or more processors in one or more computers, the computer program instructions including instructions that upon said execution cause the one or more computers to:
   direct network traffic that was sent from a client for a server instead to a network device for inspection, said directing being in accord with a configuration; and
   observe results of inspection by the network device and adjust a scope of said network traffic directed to the network device;
   wherein adjustment is based on observing at least one of the following classes of network traffic and taking an action with respect thereto:
   (a) a class of network traffic that, upon inspection by the network device, produces errors that cause a feedback analysis system to deem the class of network traffic incompatible with inspection at the network device, and,
   (b) a class of network traffic that, upon inspection by the network device, contains sensitive data that causes the feedback analysis system to deem the class of network traffic not suitable for inspection at the network device,
   the classes of network traffic (a), and (b) each being defined by any of domain names and IP addresses.

\* \* \* \* \*